(12) United States Patent
Aoyama et al.

(10) Patent No.: US 11,421,556 B2
(45) Date of Patent: Aug. 23, 2022

(54) MANUFACTURING METHOD OF TURBINE HOUSING

(71) Applicant: Marelli Corporation, Saitama (JP)

(72) Inventors: Masanori Aoyama, Saitama (JP); Hiroshi Sakurai, Saitama (JP); Suguru Shimoda, Saitama (JP); Keiji Kanomata, Saitama (JP); Shin Kuwahara, Saitama (JP); Takashi Iiya, Saitama (JP)

(73) Assignee: Marelli Corporation, Saitama (JP)

( * ) Notice: Subject to any disclaimer, the term of this patent is extended or adjusted under 35 U.S.C. 154(b) by 218 days.

(21) Appl. No.: 16/956,919

(22) PCT Filed: Nov. 15, 2018

(86) PCT No.: PCT/JP2018/042236
§ 371 (c)(1),
(2) Date: Jun. 22, 2020

(87) PCT Pub. No.: WO2019/130879
PCT Pub. Date: Jul. 4, 2019

(65) Prior Publication Data
US 2020/0392870 A1 Dec. 17, 2020

(30) Foreign Application Priority Data
Dec. 26, 2017 (JP) .............................. JP2017-249156

(51) Int. Cl.
*F01D 25/24* (2006.01)
*B23P 15/00* (2006.01)
*F01D 25/26* (2006.01)

(52) U.S. Cl.
CPC ............ *F01D 25/243* (2013.01); *B23P 15/00* (2013.01); *B23P 15/006* (2013.01); *F01D 25/26* (2013.01);
(Continued)

(58) Field of Classification Search
CPC .... B23P 15/00; B23P 15/006; Y10T 29/4932; F05D 2230/232
See application file for complete search history.

(56) References Cited

U.S. PATENT DOCUMENTS 7,371,047 B2 * 5/2008 Burmester ............ F01D 17/165
  415/214.1
8,590,305 B2 * 11/2013 Anschel ................. F02B 37/22
  415/126

(Continued)

FOREIGN PATENT DOCUMENTS

JP 2002-349275 A 12/2002
JP 2008057448 A * 3/2008

(Continued)

*Primary Examiner* — Sarang Afzali
(74) *Attorney, Agent, or Firm* — Young Basile Hanlon & MacFarlane, P.C.

(57) ABSTRACT

In an inner pipe assembly step, sheet-metal-made inner-pipe divided bodies and a cast inner-pipe divided body are connected to assemble an inner pipe. In a center flange connecting step, the sheet-metal-made inner-pipe divided bodies are connected to a center flange. In an outer pipe connecting step, an outer pipe covering the inner pipe is connected to the center flange and an exhaust-air-inlet-side flange. In a masking step, at least one of: a connected portion between the sheet-metal-made inner-pipe divided bodies and the cast inner-pipe divided body; or an opening portion between the outer pipe and the inner pipe is sealed. In a cutting machining step, an inner wall surface of the cast inner-pipe divided body facing the turbine wheel is subjected to a cutting machining after the masking step.

6 Claims, 13 Drawing Sheets

(52) U.S. Cl.
CPC ...... *F05D 2220/40* (2013.01); *F05D 2230/21* (2013.01); *F05D 2230/232* (2013.01); *F05D 2240/14* (2013.01); *F05D 2240/60* (2013.01); *F05D 2250/15* (2013.01); *F05D 2250/29* (2013.01); *Y10T 29/4932* (2015.01)

(56) References Cited

U.S. PATENT DOCUMENTS

| | | | |
|---|---|---|---|
| 10,519,806 B2 * | 12/2019 | Yokoshima | F01D 25/24 |
| 10,570,779 B2 * | 2/2020 | Hara | B23K 9/02 |
| 2004/0013479 A1 | 1/2004 | Alvarez-Vega | |
| 2018/0328226 A1 | 11/2018 | Yokoshima et al. | |
| 2020/0318487 A1 * | 10/2020 | Okamoto | F01D 9/02 |

FOREIGN PATENT DOCUMENTS

| | | | |
|---|---|---|---|
| JP | 2014-047714 A | 3/2014 |
| JP | 2016-031027 A | 3/2016 |
| JP | 2017-089450 A | 5/2017 |

* cited by examiner

MANUFACTURING METHOD OF TURBINE HOUSING

CROSS-REFERENCE TO RELATED APPLICATION(S)

This application is a national stage 371 application of PCT/JP2018/042236, filed on Nov. 15, 2018, which claims priority to and the benefit of Japanese Application Patent Serial No. 2017-249156, filed Dec. 26, 2017, the entire disclosures of which are hereby incorporated by reference.

TECHNICAL FIELD

The present invention relates to a manufacturing method of a turbine housing used for a turbocharger (turbo-supercharger) of a vehicle.

BACKGROUND

Japanese Unexamined Patent Application Publication No. 2002-349275 proposes, for example, a turbine housing fabricated by press molded parts of steel plates in order to achieve weight reduction. In this turbine housing, each of an outer housing and an inner housing, which is encapsulated by the outer housing such that a space is formed therebetween, is formed by being divided into halved members. The halved members of the inner housing thus divided are assembled in a mutually slidable manner so as to be capable of being opened/closed. In other words, the turbine housing has a double-shell structure having the space between an inner pipe that is the inner housing and an outer pipe that is the outer housing. In addition, the inner housing is formed by welding scroll portions with each other.

SUMMARY

In a turbine housing, because a high dimensional accuracy is required for portions forming a tip clearance with a turbine wheel, a cutting machining work is required. In a case in which the turbine housing having the above-described double-shell structure is manufactured, there is a risk in that foreign matters, such as chips, etc., enter the double shell formed of an inner pipe and an outer pipe. In addition, if there is a connected portion in a scroll portion, there is a risk in that the chips, etc. enter a gap formed between members and they are trapped therein.

Thus, an object of the present invention is to provide a manufacturing method of a turbine housing in which entrance of chips, etc. formed during a cutting machining work is suppressed even in a case in which a turbine housing is formed of a plurality of members.

According to the present invention, a manufacturing method of a turbine housing includes: an inner pipe assembly step of assembling an inner pipe forming a spiral-shaped exhaust gas flow path by connecting a sheet-metal-made inner-pipe divided body and a cast inner-pipe divided body; a center flange connecting step of connecting the sheet-metal-made inner-pipe divided body to a center flange, the a center flange being configured to receive a driving shaft of a turbine wheel; an outer pipe connecting step of connecting an outer pipe covering the inner pipe to an exhaust-air-inlet-side flange and the center flange, the exhaust-air-inlet-side flange forming an exhaust-air inlet to the inner pipe; a masking step of sealing at least one of: a connected portion between the sheet-metal-made inner-pipe divided body and the cast inner-pipe divided body; or an opening portion between the inner pipe and a part of the outer pipe connected to the exhaust-air-inlet-side flange; and a cutting machining step of performing, after the masking step, cutting machining of an inner wall surface of the cast inner-pipe divided body facing the turbine wheel.

According to the present invention, it is possible to provide the manufacturing method of the turbine housing in which entrance of chips, etc. formed during a cutting machining work is suppressed even in a case in which the turbine housing is formed of a plurality of members.

DETAILED DESCRIPTION

Figure 1:
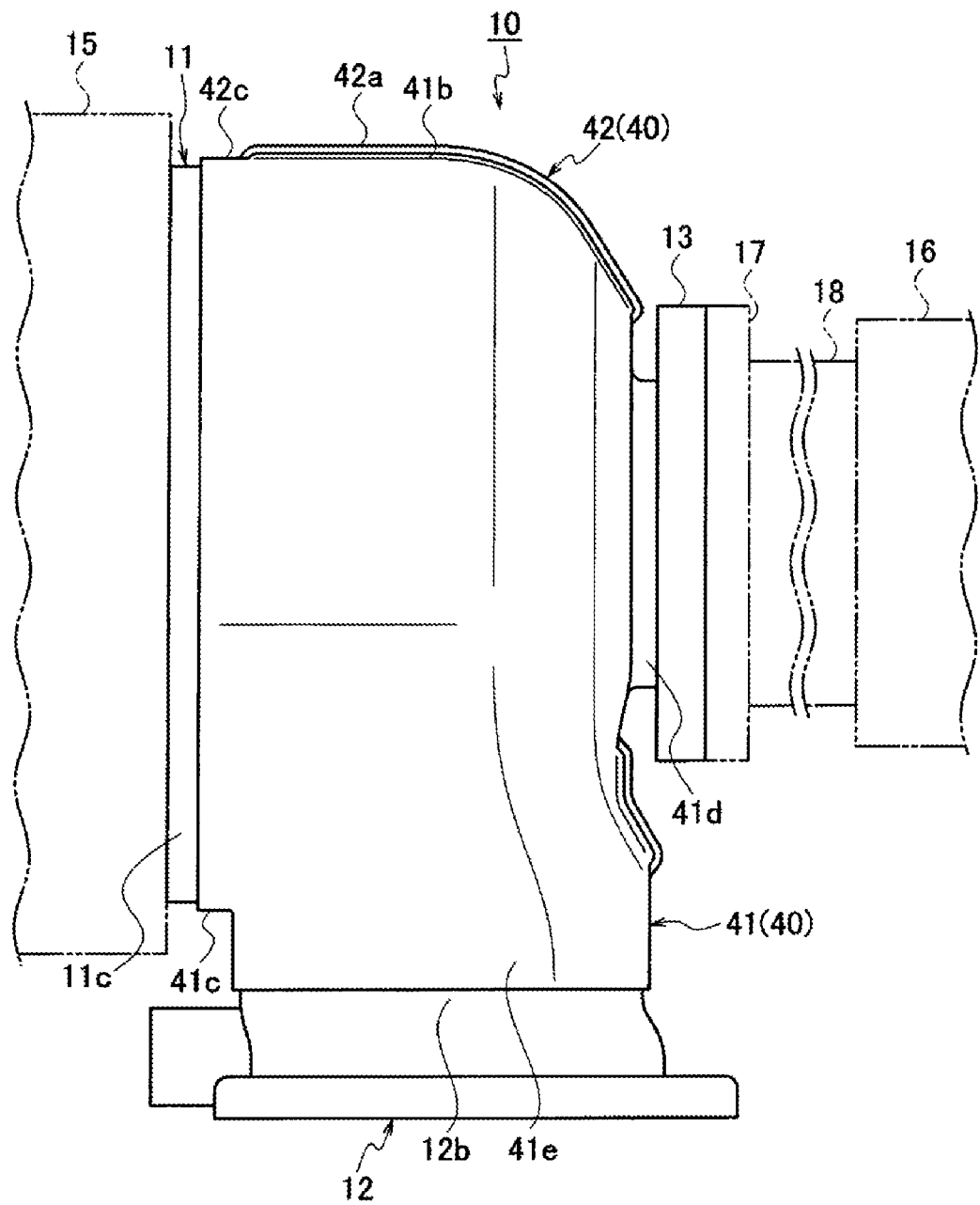
FIG. 1 is a side view of a turbine housing used for a turbocharger of an embodiment of the present invention.

An embodiment of the present invention will be described below with reference to the drawings.

A turbine housing 10 of an embodiment of the present invention will be described with reference to FIGS. 1 to 13.

The turbine housing 10 shown in FIGS. 1 to 4 is used as a housing of a turbocharger (turbo-supercharger) of a vehicle. The turbine housing 10 has a double-shell (double pipe) structure formed of: an inner pipe 20 serving as a scroll portion that forms a spiral (spiral shaped) exhaust gas flow path K provided among a cast-metal-made center flange 11, an exhaust-air-inlet-side flange 12, which is made of a cast metal, forming an inlet or opening portion 12a for exhaust gas B, and an exhaust-air-outlet-side flange 13 (the downstream side of exhaust air flow) forming an outlet 13a for the exhaust gas B; an exhaust tube 30 that is connected to a part of the inner pipe 20 (a cylinder shaped portion 23d) on the exhaust-air-outlet side; and an outer pipe 40 that covers both of the inner pipe 20 and the exhaust tube 30 such that a predetermined space G is formed therebetween. In the turbine housing 10, the exhaust gas B that has entered from the inlet or opening portion 12a of the exhaust-air-inlet-side flange 12 is discharged from the outlet 13a of the exhaust-air-outlet-side flange 13 made of a cast metal via a turbine wheel 14 that is provided at the spiral center portion (center portion) O of the inner pipe 20.

As shown in FIG. 1, a compressor 15 is connected to the center flange 11. In addition, an emission control device or catalytic converter 16 for removing toxic pollutants from the exhaust gas B is connected via a joint flange 17 and a joint tube 18 to the exhaust-air-outlet-side flange 13 through which the exhaust gas B is discharged. In other words, the turbine housing 10 is disposed between the compressor 15 provided on the intake air inlet side and the catalytic converter 16.

Figure 2:
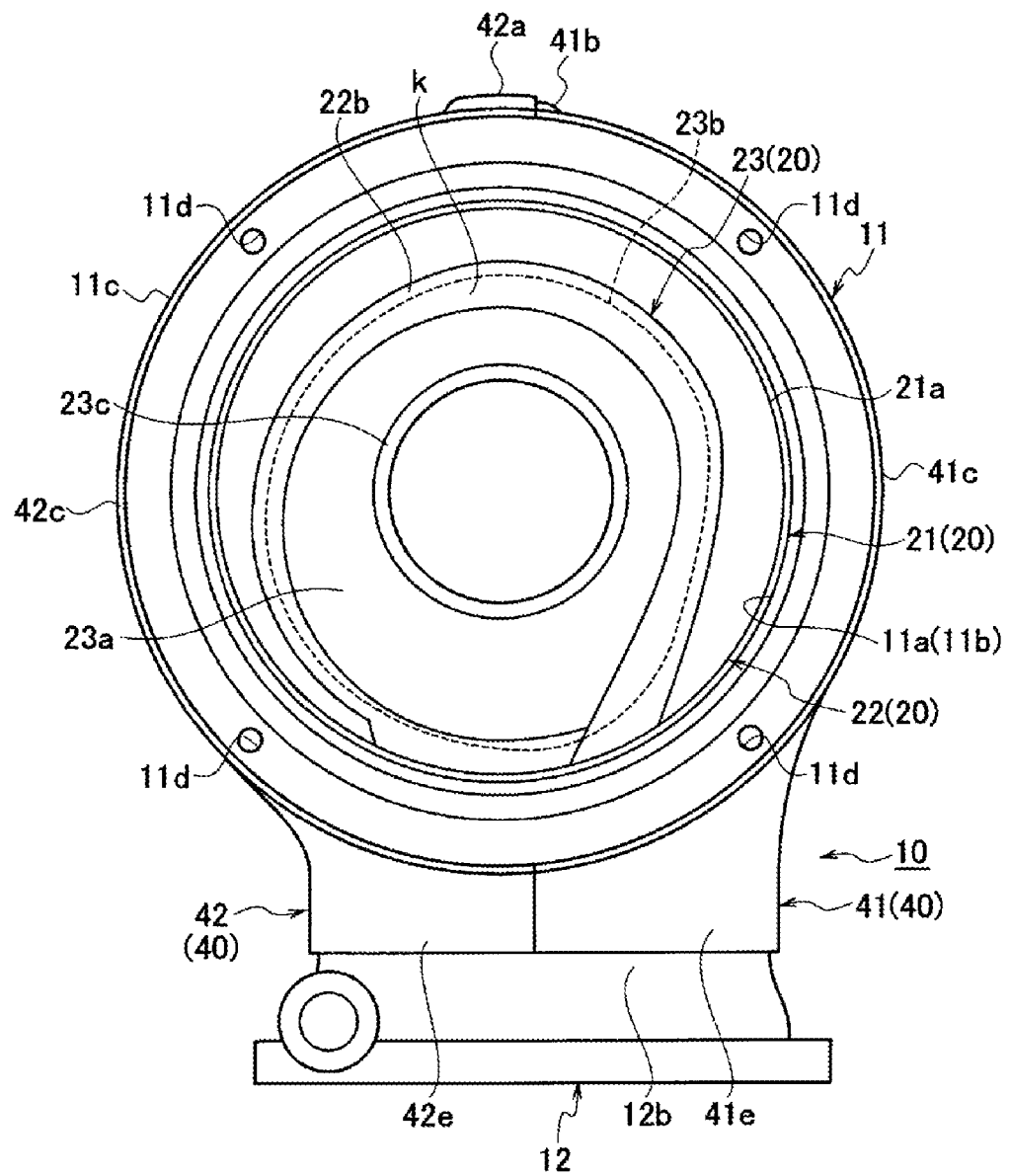
FIG. 2 is a front view of the turbine housing.
Figure 4:
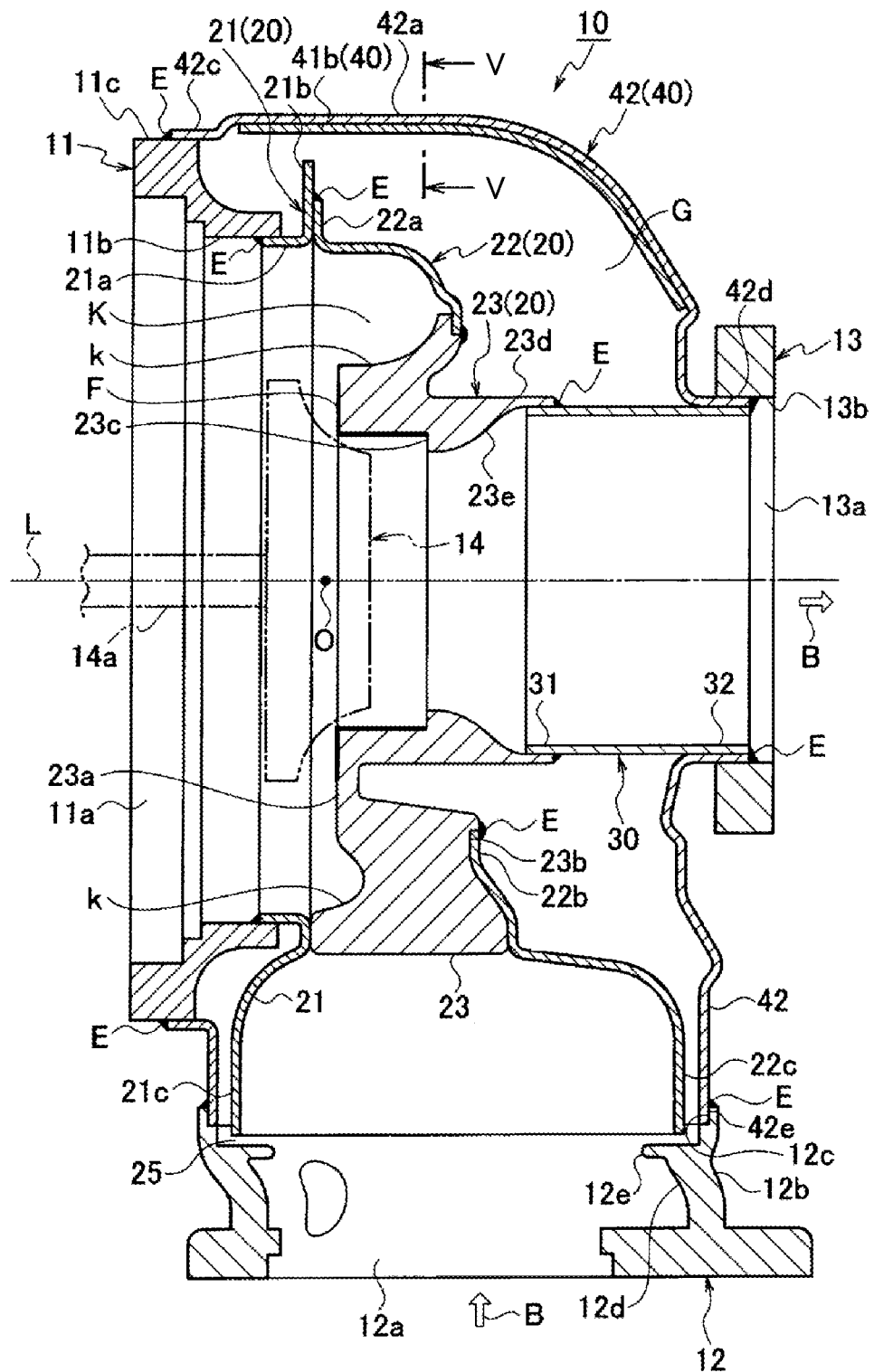
FIG. 4 is a sectional view of the turbine housing.
Figure 5:
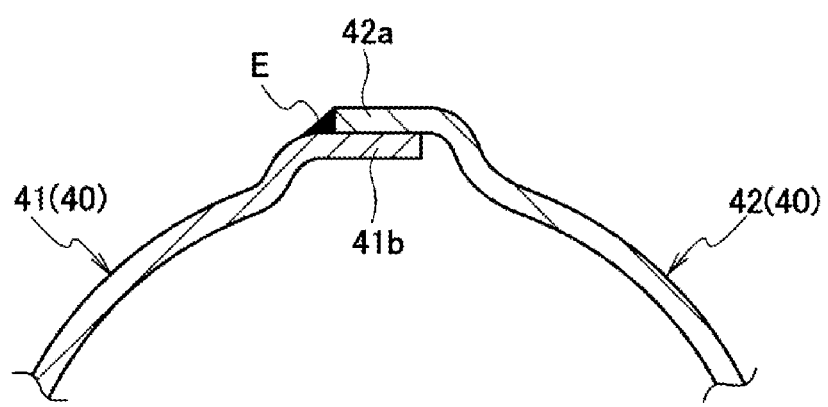
FIG. 5 is a sectional view taken along a line V-V in FIG. 4.

As shown in FIGS. 2 and 4, the inner pipe 20, also called the scroll portion, essentially defines and forms the spiral-shaped exhaust gas flow path K for the exhaust gas B in the housing. In addition, the outer pipe 40 forms an outer-shell structure body that completely covers the inner pipe 20 and the exhaust tube 30 such that the predetermined space G is formed between the outer pipe 40 and both of the inner pipe 20 and the exhaust tube 30, that encloses the inner pipe 20 and the exhaust tube 30 so as to simultaneously provide protection and thermal insulation, and that achieves the purpose of increasing rigidity of the turbine housing 10 as a whole.

As shown in FIG. 4, the inner pipe 20 is formed of: a first inner-pipe divided body 21 and a second inner-pipe divided body 22 that are formed by being divided into two members along the direction orthogonal to the shaft direction L of a driving shaft or turbine shaft 14a of the turbine wheel 14; and a third inner-pipe divided body 23 that is located at a regional part facing the turbine wheel 14 (a region on the side of the exhaust air outlet of the exhaust gas B). The first inner-pipe divided body 21 and the second inner-pipe divided body 22 are formed of thin plate-like shaped sheet-metal-made scroll members, and the third inner-pipe divided body 23 is formed of a scroll plate member made of the cast metal, which is formed by casting as a material having higher heat resistance than the material made of sheet metal.

As shown in FIGS. 2 and 4, the first inner-pipe divided body 21 and the second inner-pipe divided body 22 are molded into a predetermined curved tube shape by subjecting the sheet metal to press working. A rear-circumferential-edge-side end portion 21b and a front-circumferential-edge-side end portion 22a of two thus-press molded members made of sheet metal, i.e. the first inner-pipe divided body 21 and the second inner-pipe divided body 22, respectively, are jointed and fixed by being welded. In other words, the end portion 21b of the first inner-pipe divided body 21 on the rear circumferential edge side and the end portion 22a of the second inner-pipe divided body 22 on the front circumferential edge side are formed by being bent outward so as to respectively have different vertical lengths, and these end portions 21b and 22a having different lengths are mutually fixed by being welded (a welded portion is shown by a reference sign E).

In addition, as shown in FIGS. 2 and 4, the third inner-pipe divided body 23 is the cast metal part and is molded into the predetermined curved tube shape. As shown in FIG. 4, an end portion 22b of the sheet-metal-made second inner-pipe divided body 22 on the rear circumferential edge side is joined and fixed to an end portion 23b having a stepped-recessed shape of the cast-metal-made third inner-pipe divided body 23 on the rear outer circumference edge side by being welded on the reverse side surface of a flow path surface k of the exhaust gas flow path K (a welded portion is shown by the reference sign E). With such a configuration, the regional part of the inner pipe 20 facing the turbine wheel 14 as the region on the side of the exhaust air outlet of the exhaust gas B is formed of the cast-metal-made third inner-pipe divided body 23 that is made of the cast-metal-made scroll member. In addition, a remaining regional part of the inner pipe 20 is formed of the sheet-metal-made first inner-pipe divided body 21 and the sheet-metal-made second inner-pipe divided body 22 that are made of the sheet-metal-made scroll plate members, and the spiral-shaped exhaust gas flow path K is formed in the inner pipe 20.

Furthermore, as shown in FIGS. 2 and 4, a front surface 23a of the cast-metal-made third inner-pipe divided body 23 is formed to have a flat portion, and is formed such that the surface area of a lower part of the front surface 23a (the exhaust-air-inlet-side flange 12 side) is larger than the surface area of an upper part of the front surface 23a (the opposite side from the exhaust-air-inlet-side flange 12). In other words, as shown in FIG. 4, the cast-metal-made third inner-pipe divided body 23 is formed such that the regional part closer to the exhaust-air-inlet-side flange 12 has greater thickness than the regional part on the opposite side thereof. With such a configuration, a part of the flow path surface k of the exhaust gas flow path K in the inner pipe 20 is formed by the cast-metal-made third inner-pipe divided body 23.

Furthermore, a recessed portion 23c having a stepped-annular shape is formed on the exhaust-air-inlet side of the cast-metal-made third inner-pipe divided body 23, and the cylinder shaped portion (barrel shaped portion) 23d is integrally formed on the exhaust-air-outlet side of the third inner-pipe divided body 23 so as to project out therefrom. A reinforcing member (not shown) having an annular ring shape for protecting the turbine wheel 14 is fitted into the recessed portion 23c having the stepped-annular shape.

In addition, as shown in FIG. 4, an inner wall of the cylinder shaped portion 23d is formed to have an inclined surface 23e having a conical shape, the diameter of which increases toward the outlet side. A front-side end portion 31 of the exhaust tube 30 is fitted to the inclined surface 23e of the inner wall of the cylinder shaped portion 23d, and both are fixed by being welded (the welded portion is shown by the reference sign E). In the above, the front-side end portion 31 side of the exhaust tube 30 may be freely slidably attached to an outer circumferential surface of the cylinder shaped portion 23d via a seal ring by forming an annular shaped recessed groove portion in the outer circumferential surface of the cylinder shaped portion 23d and by fitting the seal ring into the annular shaped recessed groove portion. In such a case, the exhaust tube 30 is arranged on the outer side of the cylinder shaped portion 23d, and therefore, it is difficult for chips, etc. to enter an interior of the cylinder shaped portion 23d.

As shown in FIGS. 1 to 4, the outer pipe 40 is formed of two sheet-metal-made thin plate members, i.e. a first outer-pipe divided body 41 and a second outer-pipe divided body 42, formed by halving the outer pipe 40 along the shaft direction L (the direction of vibration during the travel of the vehicle) of the turbine shaft 14a of the turbine wheel 14. The first outer pipe divided body 41 and the second outer pipe divided body 42 are molded into a predetermined curved shape by subjecting the sheet metal to the press working. Two thus-press molded members, i.e. the sheet-metal-made first outer pipe divided body 41 and the sheet-metal-made second outer pipe divided body 42, are joined by the welding, and thereby, the inner pipe 20 and the exhaust tube 30 are completely covered such that the predetermined space G is formed between the outer pipe 40 and both of the inner pipe 20 and the exhaust tube 30.

Figure 3:
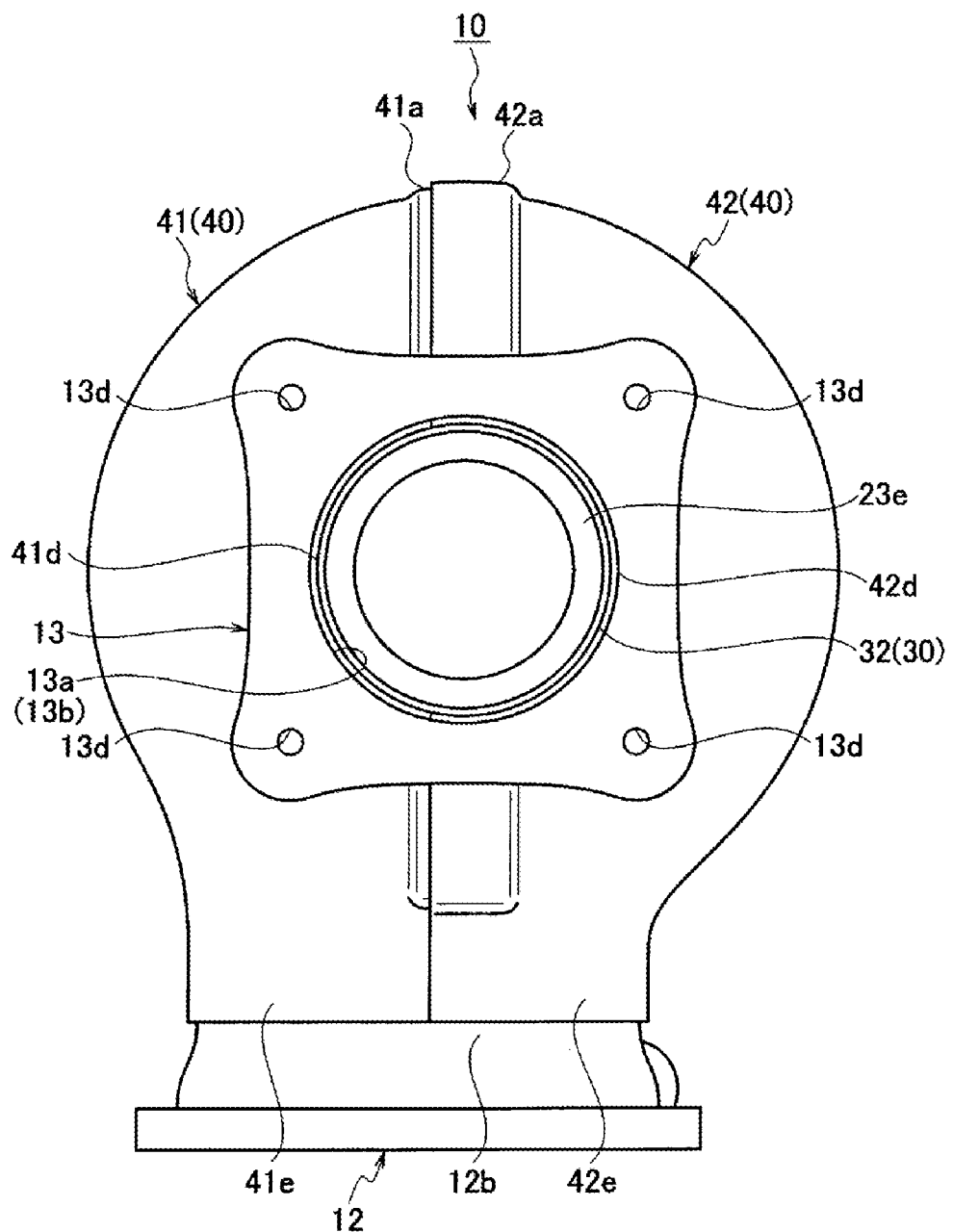
FIG. 3 is a rear view of the turbine housing.

In other words, as shown in FIGS. 1, 3, and 4, a second end portion 41b of the sheet-metal-made first outer pipe divided body 41 extending by forming a step and a first end portion 42a of the sheet-metal-made second outer pipe divided body 42 extending by forming a step are fixed to each other by overlaying the first end portion 42a on the second end portion 41b of the first outer pipe divided body 41 and by being welded (the welded portions are shown by the reference sign E) along the shaft direction (shaft line direction) L of the turbine shaft 14a of the turbine wheel 14. With such a configuration, because expansion and/or contraction is caused about the shaft direction L of the turbine shaft 14a during the travel of the vehicle, the welding is performed along the shaft direction L, and thereby, a fracture of the weld line is prevented.

As shown in FIGS. 2 and 4, a front-circumferential-edge-side end portion 21a of the sheet-metal-made first inner-pipe divided body 21 of the inner pipe 20 is fixed to an inner circumferential surface 11b of the center flange 11 by being welded (the welded portion is shown by the reference sign E). In addition, respective front-circumferential-edge-side end portions 41c and 42c of the sheet-metal-made first outer pipe divided body 41 and the sheet-metal-made second outer pipe divided body 42 forming the outer pipe 40 are fixed to an outer circumferential surface 11c of the center flange 11 by being welded (welded portions are shown by the reference sign E). In the above, a plurality of screw holes 11d for attaching bolts are formed in the center flange 11 at equal intervals.

As shown in FIG. 4, the exhaust-air-inlet-side flange 12 is formed so as to have a substantially annular shape, and its opening portion 12a forms the inlet of the exhaust gas B. A recessed portion 12c having the stepped-annular shape is formed at the inner side of the top side of an outer circumferential surface 12b of the exhaust-air-inlet-side flange 12, and a stepped portion 12e is integrally formed on an intermediate part of an inner circumferential surface 12d of the exhaust-air-inlet-side flange 12 so as to protrude radially inward. A lower end portion 21c side of the sheet-metal-made first inner-pipe divided body 21 and a lower end portion 22c side of the sheet-metal-made second inner-pipe divided body 22 of the inner pipe 20 are each formed to have a semi-arc curved shape extending along the stepped portion 12e and loosely fitted so as to be freely extendable/contractable by forming a space or an opening portion 25 with the stepped portion 12e. In other words, the inner pipe 20 is provided so as to be slidable with respect to the exhaust-air-inlet-side flange 12 in the opening portion 25 formed between the inner pipe 20 and the exhaust-air-inlet-side flange 12.

In addition, as shown in FIGS. 2 to 4, lower end portions 41e and 42e sides of the sheet-metal-made first outer-pipe divided body 41 and the sheet-metal-made second outer-pipe divided body 42 forming the outer pipe 40 are respectively formed to have the semi-arc curved shape extending along the recessed portion 12c of the exhaust-air-inlet-side flange 12 and fixed to the upper side of the outer circumferential surface 12b by being welded (the welded portion is shown by the reference sign E) in a state in which both are fitted into the recessed portion 12c. In the above, a plurality of screw holes (not shown) for attaching bolts are formed in the exhaust-air-inlet-side flange 12 at equal intervals.

Furthermore, as shown in FIGS. 3 and 4, the exhaust-air-outlet-side flange 13 is formed to have a substantially rectangular plate shape, and a circular opening portion or outlet 13a forms the outlet of the exhaust gas B at its center. A rear-side end portion 32 of the exhaust tube 30 and respective rear-circumferential-edge side end portions 41d and 42d of the sheet-metal-made first outer pipe divided body 41 and the sheet-metal-made second outer pipe divided body 42 forming the outer pipe 40 are fixed to an inner circumferential surface 13b of the exhaust-air-outlet-side flange 13 by being welded (the welded portion is shown by the reference sign E). In the above, screw holes 13d for attaching bolts are respectively formed on corner portions of the exhaust-air-outlet-side flange 13.

The outer pipe 40 formed of the first outer-pipe divided body 41 and the second outer-pipe divided body 42 is welded to the center flange 11 over the entire circumference thereof, welded to the exhaust-air-inlet-side flange 12 over the entire circumference thereof, and welded to the exhaust-air-outlet-side flange 13 over the entire circumference thereof. In the above, it suffices that the outer pipe 40 is welded to the respective flanges such that the inner pipe 20 is sealed, and welding points to the respective flanges may appropriately be selected from their outer circumferences or inner circumferences.

When the turbine housing 10 is assembled, the sheet-metal-made inner-pipe divided bodies (the first inner-pipe divided body 21 and the second inner-pipe divided body 22) and the cast inner-pipe divided body (the third inner-pipe divided body 23) are connected to assemble the inner pipe 20 forming the spiral-shaped exhaust gas flow path K (an inner pipe assembly step). In addition, the sheet-metal-made inner-pipe divided bodies (the first inner-pipe divided body 21 and the second inner-pipe divided body 22) are connected to the center flange 11 receiving the driving shaft or turbine shaft 14a of the turbine wheel 14 (a center flange connecting step). In addition, in a case in which the sheet-metal-made inner-pipe divided bodies are respectively formed of the first inner-pipe divided body 21 and the second inner-pipe divided body 22, at least abutting portions extending outward from the inner pipe 20 are respectively provided on the first inner-pipe divided body 21 and the second inner-pipe divided body 22, and these abutting portions are welded together (a welding step). Furthermore, the outer pipe 40 covering the inner pipe 20 is connected to the center flange 11 (an outer pipe connecting step).

Figure 7:
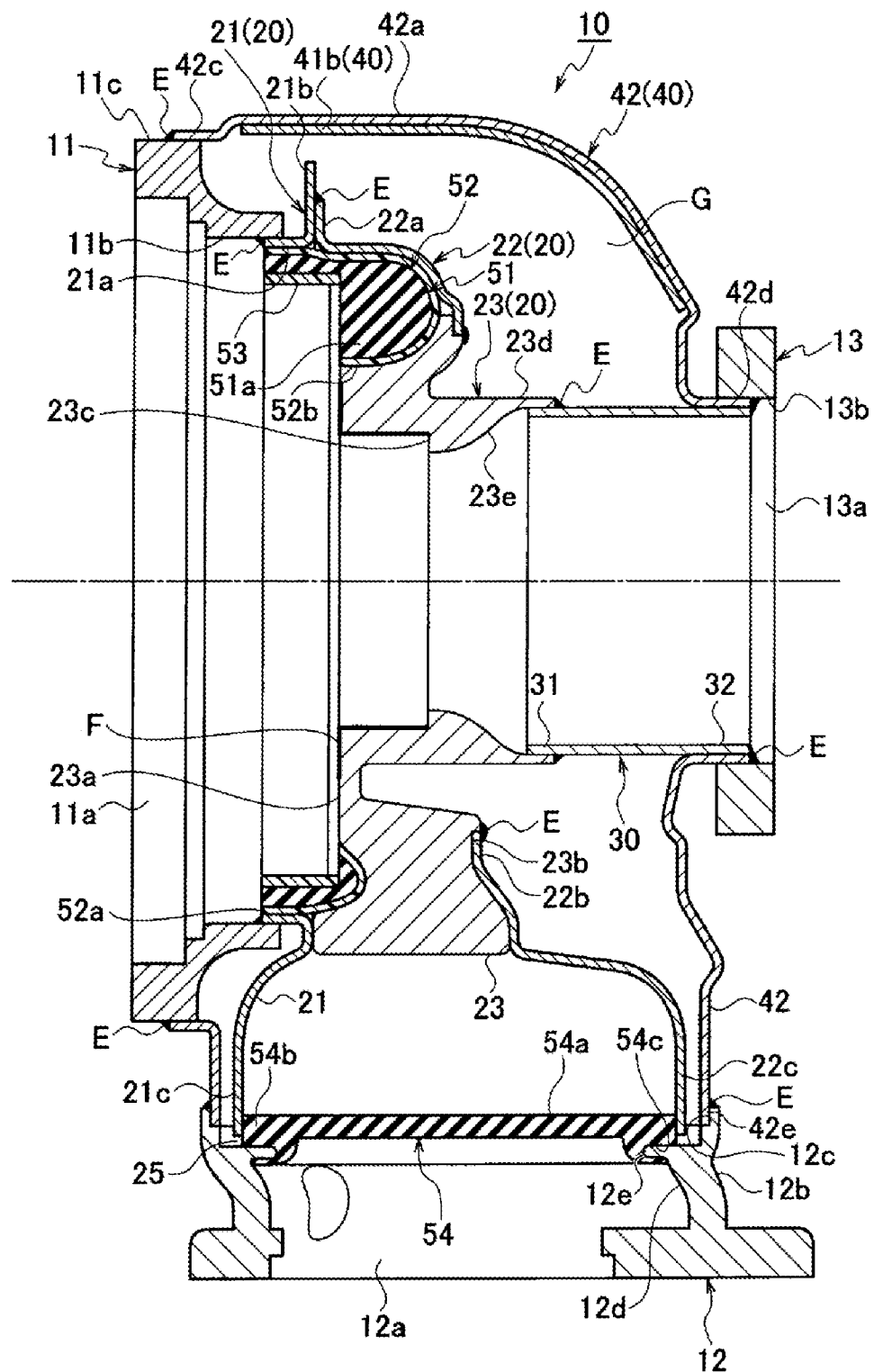
FIG. 7 is a sectional view showing a state in which the plurality of masking jigs are attached in the manufacture of the turbine housing.

As described above, the turbine housing 10 whose assembly (the inner pipe assembly step, the center flange connecting step, the welding step, and the outer pipe connecting step) has been completed is subjected to, in a subsequent manufacturing process, cutting machining processing of respective components (cutting machining points are shown by thick lines and a reference sign F in FIGS. 4 and 7) using four masking jigs 51 to 54, shown in FIGS. 8 to 11, and to a washing operation, thereby being provided as a finished product. In the above, in the front surface 23a of the third inner-pipe divided body 23, only a part of the front surface 23a facing the turbine wheel 14 may be subjected to the cutting machining or the whole surface of the front surface 23a may be subjected to the cutting machining. In the above, upon performing the cutting machining work (a cutting machining step), it is preferable to perform the cutting machining work in a state in which the turbine housing 10 is mounted such that the center flange 11 faces upward or sideward. In such a case, it is difficult for the chips, etc. to enter the interior of the turbine housing 10.

After the inner pipe assembly step, but before the cutting machining step performing the cutting machining processing, at least one of: the connected portion between the sheet-metal-made inner-pipe divided body (the second inner-pipe divided body 22) and the cast inner-pipe divided body (the third inner-pipe divided body 23); or the opening portion between the inner pipe 20 and a portion of the outer pipe 40 connected to the exhaust-air-inlet-side flange 12 is sealed (masking step). In addition, in the masking step, at least the inner side of the abutting portion between the first inner-pipe divided body 21 and the second inner-pipe divided body 22 is sealed. In the cutting machining step, the cutting machining is performed on at least an inner wall surface (the front surface 23*a*) facing the turbine wheel 14 in the cast inner-pipe divided body (the third inner-pipe divided body 23). In addition, in the cutting machining step, it preferable to perform the cutting machining on the inner wall surface (the front surface 23*a*) facing the turbine wheel 14 by taking an inner circumferential surface of the center flange 11 as the reference. The cutting machining step is performed subsequent to all welding steps in the manufacturing step of the turbine housing 10. The washing operation is then performed on the turbine housing 10 after the cutting machining step (a washing step).

Figure 6:
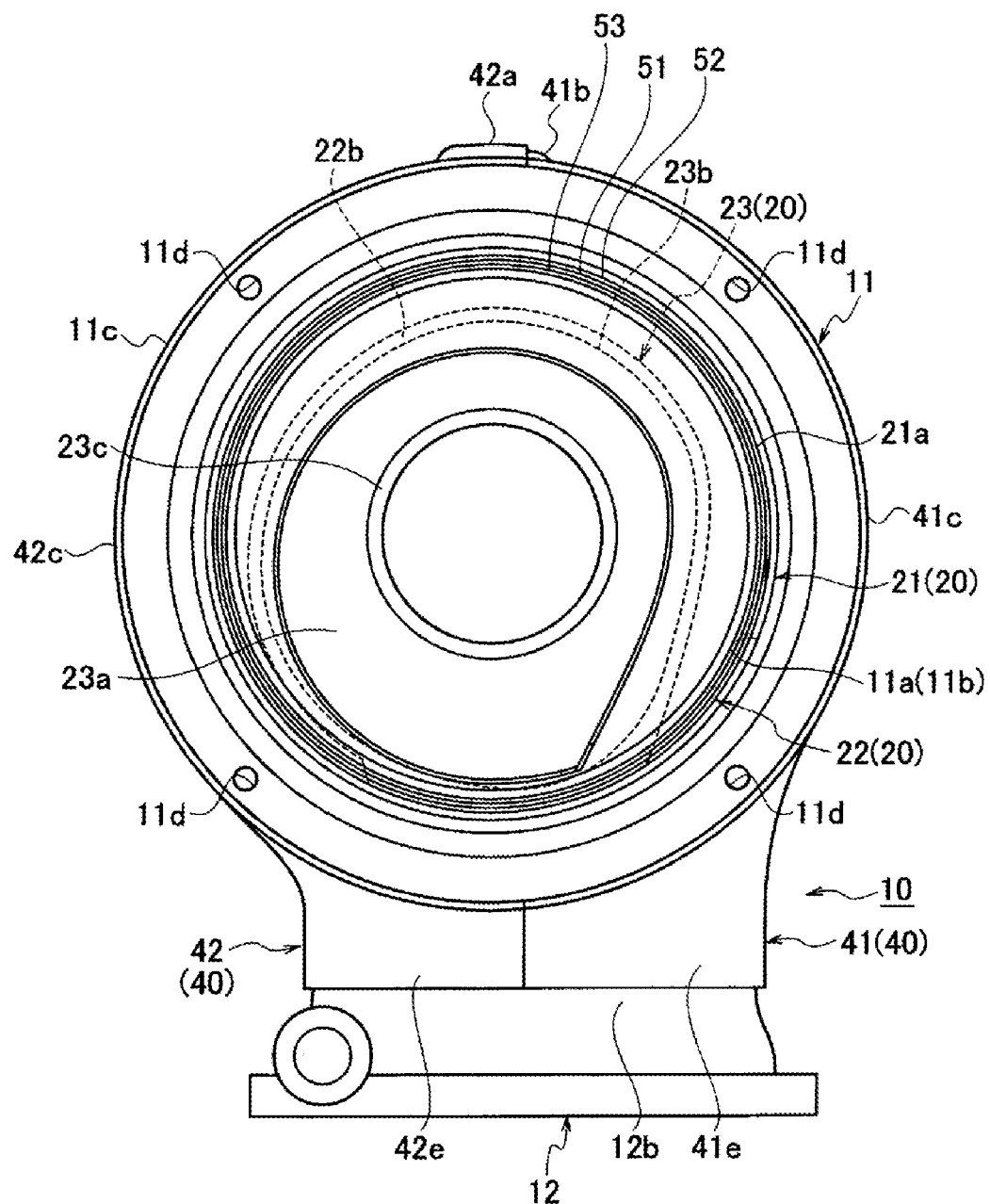
FIG. 6 is a front view showing a state in which a plurality of masking jigs are attached in a manufacture of the turbine housing.
Figure 8:
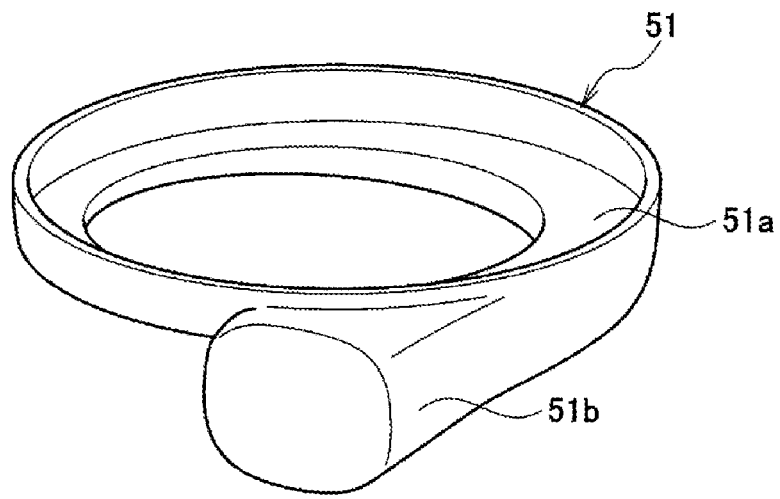
FIG. 8 is a perspective view of a masking jig made of rubber attached to an inner pipe of the turbine housing.

The masking jig 51 shown in FIG. 8 is made of rubber, and is formed so as to extend along the inner pipe 20 serving as the scroll portion forming the spiral-shaped exhaust gas flow path K of the turbine housing 10 by having an annular shaped jig main body 51*a* having a L-shaped cross-section and a projected portion 51*b* that projects out from an outer circumference portion of the jig main body 51*a*. As shown in FIGS. 6 and 7, the masking jig 51 made of the rubber is attached to joint portions such as: the abutting portion between the first inner-pipe divided body 21 and the second inner-pipe divided body 22, which are made of sheet metal, forming the inner pipe 20; the abutting portion between the second inner-pipe divided body 22 and the cast-metal-made third inner-pipe divided body 23; and so forth with the intervening masking jig 52 made of silicone resin, which will be described below, and thereby, spaces in the above-described joint portions are covered and sealed with high reliability with an elastic force exerted by the compressed rubber.

Figure 9:
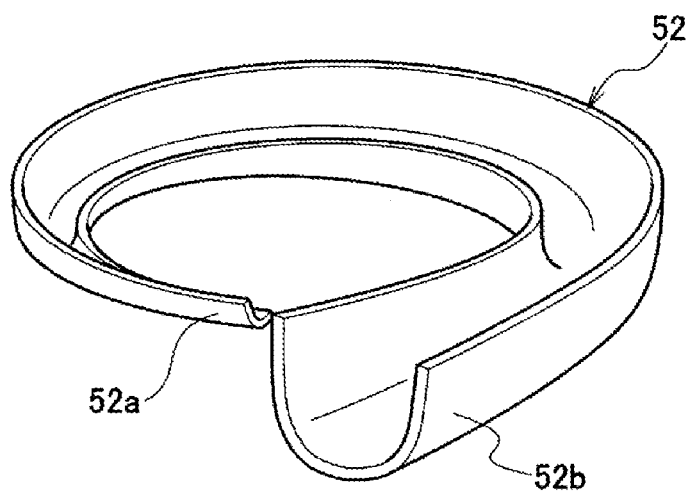
FIG. 9 is a perspective view of a masking jig made of silicone resin attached to the inner pipe of the turbine housing.

The masking jig 52 shown in FIG. 9 is made of the silicone resin and is formed to have a substantially C-shape such that a base end portion 52*b* having a large-diameter halfcurved shape extends along the inner pipe 20 serving as the scroll portion, which forms the spiral-shaped exhaust gas flow path K from a tip end portion 52*a* having a small-diameter halfcurved shape. As shown in FIGS. 6 and 7, the masking jig 52 made of the silicone resin is directly attached to the joint portion between the sheet-metal-made first inner-pipe divided body 21 and the second inner-pipe divided body 22 forming the inner pipe 20 and the joint portion between the second inner-pipe divided body 22 and the cast-metal-made third inner-pipe divided body 23, and thereby, the entry of extraneous matter into the interior of the product is prevented even when the masking jig 51 made of the rubber is deformed due to an external factor.

Figure 10:
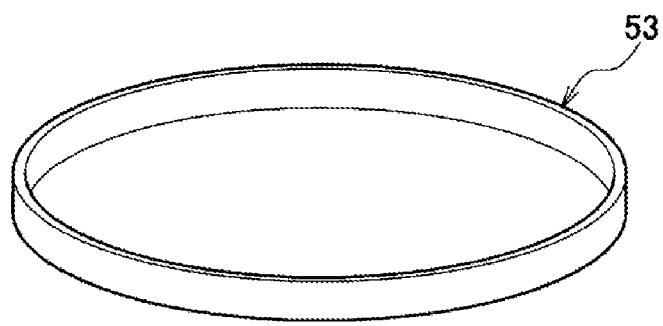
FIG. 10 is a perspective view of a masking jig made of synthetic resin attached to the inner pipe of the turbine housing.

The masking jig 53 shown in FIG. 10 is made of a hard synthetic resin and is formed to have a ring (cylinder) shape. As shown in FIG. 7, the masking jig 53 is fitted into the annular jig main body 51*a* having the L-shaped cross-section of the rubber-made masking jig 51, and thereby, the masking jig 53 prevents deformation of a thin-walled portion of an outer circumference of the annular jig main body 51*a* having a L-shaped cross-section of the rubber-made masking jig 51 due to the external factor. In other words, the hard masking jig 53 made of the synthetic resin has a function as a reinforcement that improves an adhesion between the product and the masking jig 51 made of the rubber, that improves a rigidity of the masking jig 51 made of the rubber, and that prevents the deformation of the masking jig 51 made of the rubber by a coolant.

Figure 11:
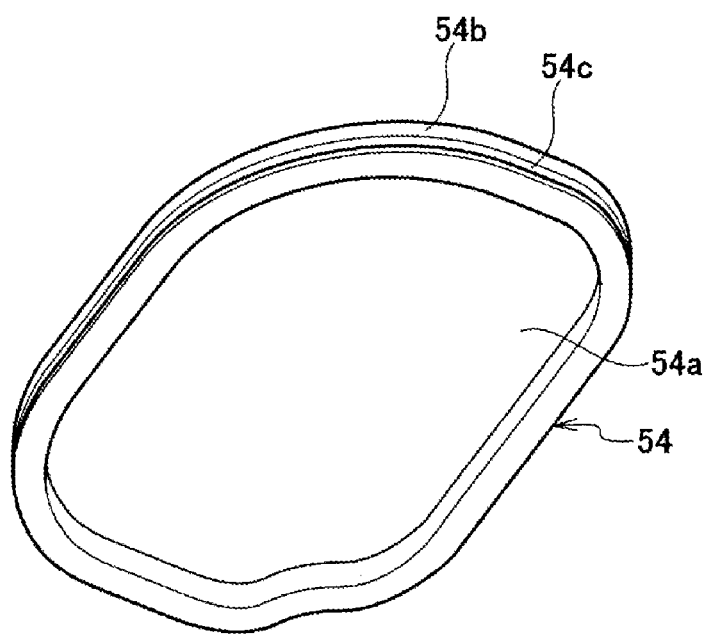
FIG. 11 is a perspective view of a masking jig made of rubber attached to an opening portion of an exhaust-air-inlet-side flange of the turbine housing.

The masking jig 54 shown in FIG. 11 is made of the rubber and is formed with an annular recessed groove portion 54*c* in an outer circumferential-side thick-walled portion 54*b* of a substantially plate shaped jig main body 54*a*. The stepped portion 12*e* that is formed on the inner circumferential surface 12*d* of the opening portion 12*a* of the exhaust-air-inlet-side flange 12 so as to project out is received in the groove portion 54*c* by being caught in the groove. The masking jig 54 is attached to the stepped portion 12*e* of the opening portion 12*a* of the exhaust-air-inlet-side flange 12, and to the inside of the lower end portion 21*c* of the sheet-metal-made first inner-pipe divided body 21 of the inner pipe 20 and the lower end portion 22*c* of the sheet-metal-made second inner-pipe divided body 22 of the inner pipe 20, and thereby, the space or opening portion 25 formed between the stepped portion 12*e* of the opening portion 12*a* of the exhaust-air-inlet-side flange 12 and each of the lower end portions 21*c* and 22*c* of the sheet-metal-made first and second inner-pipe divided bodies 21 and 22 is covered and sealed with high reliability.

Figure 13:
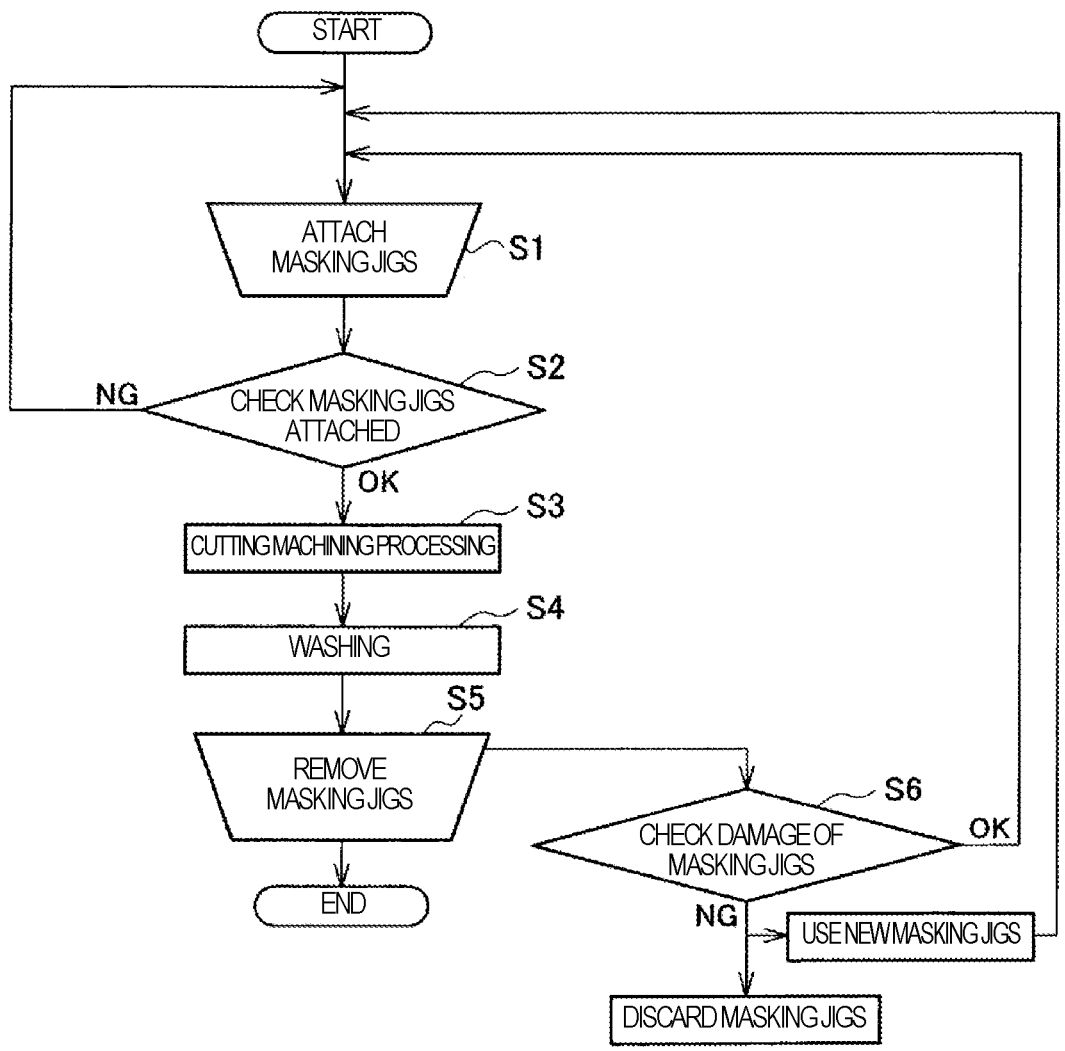
FIG. 13 is a flowchart showing a manufacturing step of the turbine housing.

Next, the manufacturing steps (the cutting machining work and washing) of the turbine housing 10 using the four masking jigs 51 to 54 after the completion of the assembly will be described by following a flowchart shown in FIG. 13.

Figure 12:
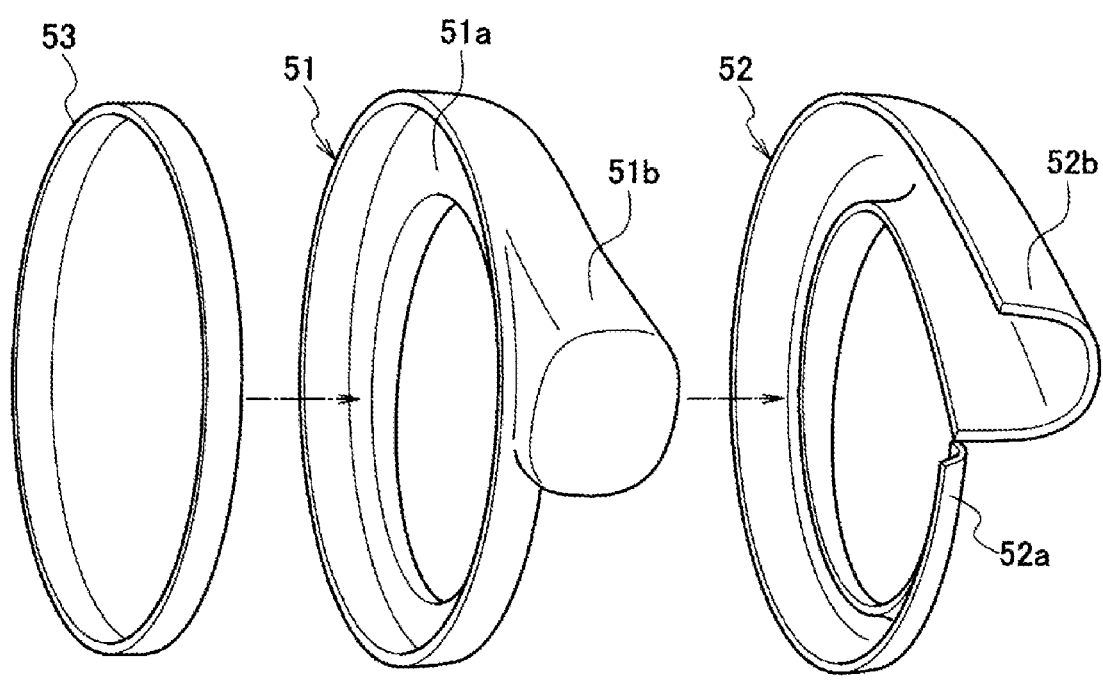
FIG. 12 is a perspective view showing an order of attaching the three masking jigs to the inner pipe of the turbine housing.

First, as shown in FIGS. 6 and 12, the spaces in the joint portions such as: the abutting portion between the first inner-pipe divided body 21 and the second inner-pipe divided body 22, which are made of sheet metal, forming the inner pipe 20; the abutting portion between the second inner-pipe divided body 22 and the cast-metal-made third inner-pipe divided body 23; and so forth are covered and sealed by attaching the masking jig 52 made of the silicone resin, the masking jig 51 made of the rubber, and the masking jig 53 made of the synthetic resin to the above-described joint portions in this order (Step S1). In addition, as shown in FIG. 7, the masking jig 54 made of the rubber is attached between the stepped portion 12*e* of the opening portion 12*a* of the exhaust-air-inlet-side flange 12 and each of the lower end portions 21*c* and 22*c* of the sheet-metal-made first and second inner-pipe divided bodies 21 and 22 to cover and seal the opening portion 25 therebetween.

Next, an attached state of the four masking jigs 51 to 54 are checked (Step S2), and if the four masking jigs 51 to 54 are not attached at appropriate positions, the attachment of the masking jigs 51 to 54 is attempted again.

Next, in a case in which the four masking jigs 51 to 54 are attached at the appropriate positions, the cutting machining processing of the inner pipe 20, etc. is performed by a machining center, a lathe, and so forth (Step S3). When burrs are formed during the cutting machining processing, the burrs are removed.

Next, washing of the interior of the turbine housing 10 is performed using a washing machine (Step S4).

Subsequent to completion of the washing of the interior of the turbine housing 10, the four masking jigs 51 to 54 are removed (Step S5). By removing the masking jigs 51 to 54, the product that meets the standard for an amount of trapped foreign matter is completed.

Next, the four masking jigs 51 to 54 used once are checked for any damage (Step S6), and in a case in which a damage has not been caused, the four masking jigs 51 to 54 are used for the cutting machining work and the washing of the following (next) turbine housing 10. The masking jigs 51 to 54 that have been damaged are discarded, and new masking jigs 51 to 54 are used for the cutting machining work and the washing of the following turbine housing 10.

As described above, by using the four masking jigs 51 to 54 that have been formed so as match the shapes of the inner pipe 20 of the turbine housing 10 and the opening portion 12a of the exhaust-air-inlet-side flange 12, the cutting machining processing, a burr removal step, and the washing are performed on the inner pipe 20, etc. after the four masking jigs 51 to 54 are attached to the inner pipe 20 and the opening portion 12a of the exhaust-air-inlet-side flange 12, and after the cutting machining work and the washing are finished, the four masking jigs 51 to 54 are removed. By doing so, when the cutting machining work is performed on the turbine housing 10 after its assembly has been finished, it is possible to prevent entry of the foreign matter such as the chips, the burrs, and so forth, which are generated during the cutting machining, into the interior of or the space formed in the double shell formed of the inner pipe 20 and the outer pipe 40 with ease and with high reliability. With such a configuration, it is possible to perform the washing in a state in which there is no entry of the foreign matter, and it is possible to produce the product that meets the strict standard for an amount of trapped foreign matter easily, reliably, and at low cost.

In addition, because the four masking jigs 51 to 54 that match the shapes of the parts to be sealed by attaching the four masking jigs 51 to 54 to the interior of the turbine housing 10 are used, it is possible to attach the four masking jigs 51 to 54 to complex regions to be sealed easily and reliably.

In addition, because the four masking jigs 51 to 54 are of non-disposal type and they can be used multiple times repeatedly, reduction in the cost can be achieved correspondingly.

Furthermore, the masking jigs 51 to 54 are not removed even during the cutting machining work, which is performed by the machining center, the lathe, and so forth, or the washing, and therefore, it is possible to attach the masking jigs 51 to 54 reliably.

The third inner-pipe divided body and the second inner-pipe divided body may integrally be connected by using a precision casting process. Also in this case, because the first inner-pipe divided body and the second inner-pipe divided body are welded, and the first inner-pipe divided body is welded to the center flange, a positional deviation may still be caused due to accumulation of dimension errors of these components or the welding. Therefore, in order to maintain the accuracy for the tip clearance with the turbine wheel, it is effective to provide the cutting machining step.

In the above, according to the above-described embodiment, although four masking jigs are used, the number of the masking jigs is not limited to four, and at least two, or four or more masking jigs may be used. Materials of these jigs are not limited to the rubber, synthetic resin, and silicone resin.

In the above, the masking jigs may be melted and ejected to the outside of the turbine housing after the cutting machining step. If the masking jigs are not reused, it is possible to easily and reliably remove the masking jigs from the interior of the turbine housing by heating and melting them.

Figure 14:
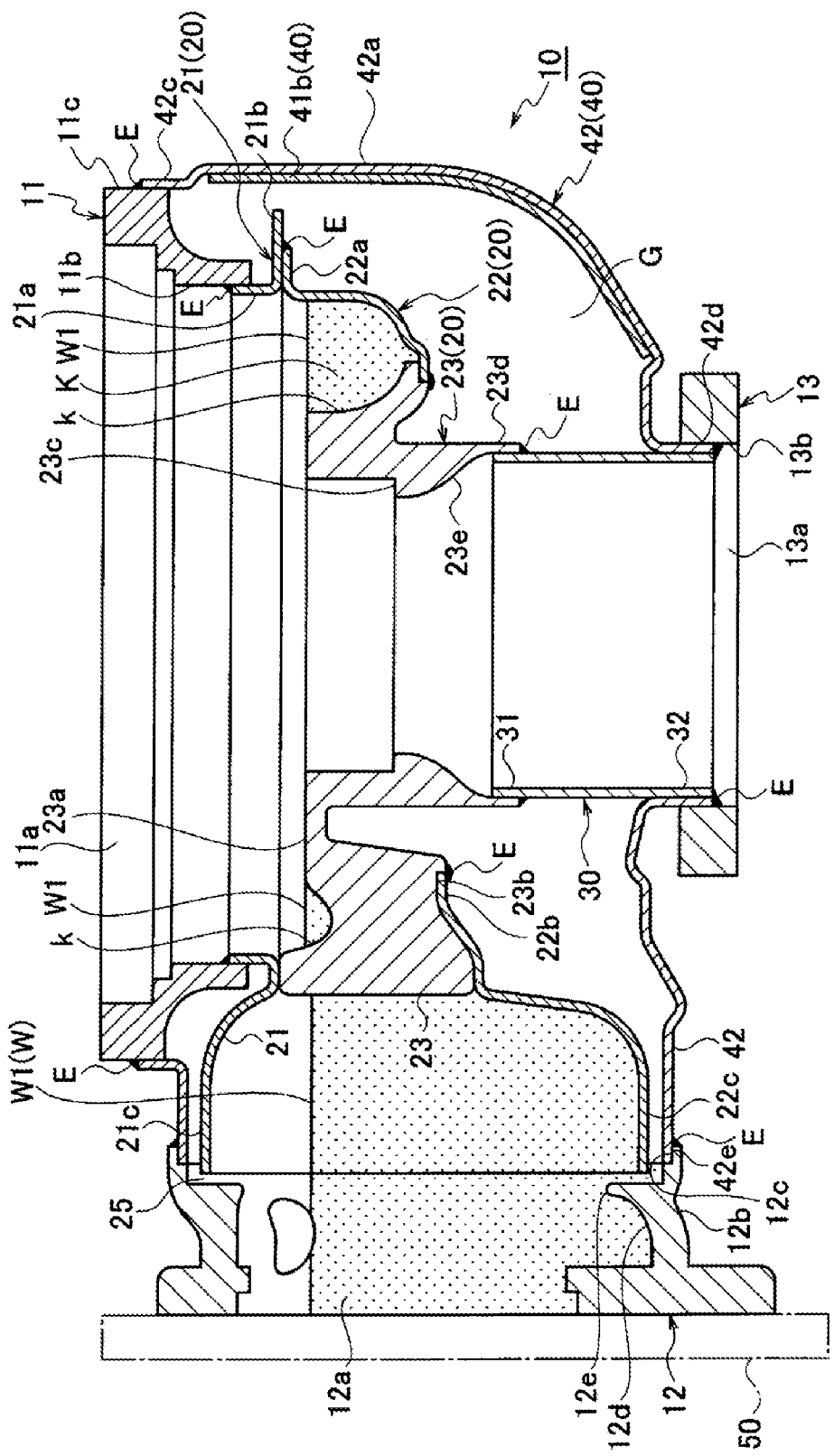
FIG. 14 is a sectional view showing a state in which an inside of the turbine housing has been masked by filling a first-time sealant.
Figure 15:
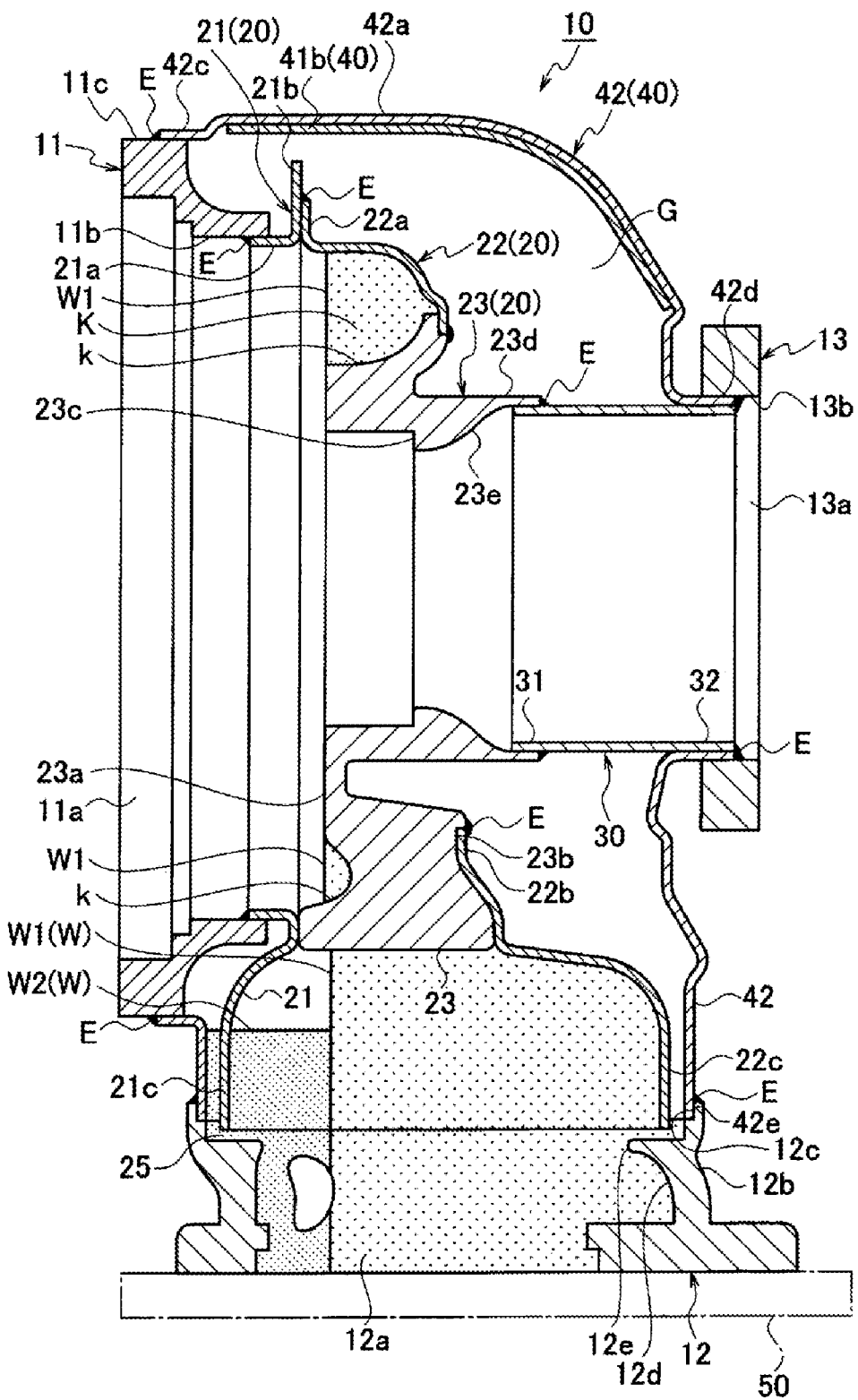
FIG. 15 is a sectional view showing a state in which the inside of the turbine housing has been masked by filling a second-time sealant.

Furthermore, as shown in FIGS. 14 and 15, it may be possible to use, as the masking jig, a wax material (sealant) W that has a solidifying property from a liquid state to a solid state.

In other words, as shown in FIG. 14, the liquid first-time wax material W is filled in a state in which the turbine housing 10 is placed in a horizontal orientation and in which the opening portion 12a of the exhaust-air-inlet-side flange 12 is sealed from the outside by a plate-shaped closing plate 50, etc., and thereby, the masking is performed with a wax material W1 that has been solidified by covering the spaces in the joint portions such as: the abutting portion between the first inner-pipe divided body 21 and the second inner-pipe divided body 22, which are made of sheet metal, forming the inner pipe 20; the abutting portion between the sheet-metal-made second inner-pipe divided body 22 and the cast-metal-made third inner-pipe divided body 23; and so forth. Next, as shown in FIG. 15, the liquid second-time wax material W is filled by placing the turbine housing 10 in a vertical orientation, and thereby, the masking is performed with a wax material W2 that has been solidified by covering the space or opening portion 25 between the stepped portion 12e of the opening portion 12a of the intake-air-inlet-side flange 12 and each of the lower end portions 21c and 22c of the first and second inner-pipe divided body 21 and 22, which are made of sheet metal. Subsequently, at least the operations such as the cutting machining processing, the burr removal step, and the washing of the inner pipe 20 are then respectively performed.

More specifically, as shown in FIG. 14, the liquid first-time wax material W is filled in a state in which the turbine housing 10, the assembly of which has been finished, is placed in the horizontal orientation and in which the opening portion 12a of the exhaust-air-inlet-side flange 12 is sealed from the outside by the plate-shaped closing plate 50, etc. By doing so, the spaces in the joint portions such as: the abutting portion between the first inner-pipe divided body 21 and the second inner-pipe divided body 22, which are made of sheet metal, forming the inner pipe 20; the abutting portion between the sheet-metal-made second inner-pipe divided body 22 and the cast-metal-made third inner-pipe divided body 23; and so forth are masked by being covered with the wax material W1 that has been solidified.

Next, as shown in FIG. 15, the turbine housing 10 is placed up right by changing the orientation thereof, and the liquid second-time wax material W is filled. By doing to, the opening portion 25 between the stepped portion 12e of the opening portion 12a of the intake-air-inlet-side flange 12 and each of the lower end portions 21c and 22c of the first and second inner-pipe divided body 21 and 22, which are made of sheet metal, is masked by being covered with the wax material W2 that has been solidified.

In summary, according to the above-described embodiment, it is possible to provide the manufacturing method of the turbine housing in which entrance of the chips, etc. is suppressed during the cutting machining work even in a case in which the turbine housing is formed of a plurality of members.

REFERENCE SIGNS LIST

10: turbine housing
11: center flange
12: exhaust-air-inlet-side flange
12a: opening portion (inlet of exhaust gas)
12e: stepped portion
13: flange on exhaust-air-outlet side 13a: opening portion (outlet of exhaust gas)
14: turbine wheel
20: inner pipe (scroll portion)
21: sheet-metal-made first inner-pipe divided body (sheet-metal-made scroll member)
21c: lower end portion
22: sheet-metal-made second inner-pipe divided body (sheet-metal-made scroll member)
22c: lower end portion
23: cast-metal-made third inner-pipe divided body (scroll member made of cast metal, which is formed by casting as a material having higher heat resistance than material made of sheet metal)
25: opening portion (space)
40: outer pipe
41: sheet-metal-made first outer-pipe divided body
41e: lower end portion
42: sheet-metal-made second outer-pipe divided body
42e: lower end portion
51 to 54: four masking jigs
B: exhaust gas
K: spiral exhaust gas flow path
G: space
O: spiral center portion (center portion)
E: welded portion

The invention claimed is:

1. A manufacturing method of a turbine housing comprising:
   an inner pipe assembly step of assembling an inner pipe forming a spiral-shaped exhaust gas flow path by connecting a sheet-metal-made inner-pipe divided body and a cast inner-pipe divided body, the sheet-metal-made inner-pipe divided body including a sheet-metal-made first inner-pipe divided body and a sheet-metal-made second inner-pipe divided body;
   a center flange connecting step of connecting the sheet-metal-made inner-pipe divided body to a center flange, the center flange being configured to receive a driving shaft of a turbine wheel;
   an outer pipe connecting step of connecting an outer pipe covering the inner pipe to an exhaust-air-inlet-side flange and the center flange, the exhaust-air-inlet-side flange forming an exhaust-air inlet to the inner pipe;
   a masking step of sealing abutting portions provided on the sheet-metal-made first inner-pipe divided body and the sheet-metal-made second inner-pipe divided body, respectively, and a connected portion between the sheet-metal-made inner-pipe divided body and the cast inner-pipe divided body of the turbine housing in an annular shape along the inner pipe serving as a scroll portion forming the spiral-shaped exhaust gas flow path, the masking step being performed on the turbine housing after the inner pipe assembly step, center flange connecting step and the outer pipe connecting step are completed; and
   a cutting machining step of performing, after the masking step, cutting machining of an inner wall surface of the cast inner-pipe divided body facing the turbine wheel.

2. The manufacturing method of the turbine housing according to claim 1, wherein the masking step is performed by using a first masking jig and a second masking jig, the first masking jig being configured to seal the connected portion between the sheet-metal-made inner-pipe divided body and the cast inner-pipe divided body, and the second masking jig being configured to seal an opening portion between the outer pipe and the inner pipe.

3. The manufacturing method of the turbine housing according to claim 2, wherein at least one of the first masking jig or the second masking jig is used multiple times.

4. The manufacturing method of the turbine housing according to claim 2, further including a step of melting and ejecting at least one of the first masking jig or the second masking jig to outside after the cutting machining step.

5. The manufacturing method of the turbine housing according to claim 1, wherein
   the abutting portions extend outward from the inner pipe and are welded, and
   the abutting portions are sealed at an inner side in the masking step.

6. The manufacturing method of the turbine housing according to claim 1, wherein the cutting machining of the inner wall surface is performed by taking an inner circumferential surface of the center flange as a reference.

* * * * *